(12) United States Patent
Huang et al.

(10) Patent No.: US 10,705,311 B2
(45) Date of Patent: Jul. 7, 2020

(54) INTEGRATED STRUCTURE OF AUTO FOCUS AND OPTICAL IMAGE STABILIZER MECHANISMS

(71) Applicant: TDK TAIWAN CORP., Yangmei Taoyuan (TW)

(72) Inventors: Ming-Hang Huang, Yangmei Taoyuan (TW); Fu-Yuan Wu, Yangmei Taoyuan (TW); Chao-Chang Hu, Yangmei Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 227 days.

(21) Appl. No.: 15/710,011

(22) Filed: Sep. 20, 2017

(65) Prior Publication Data

US 2018/0157004 A1 Jun. 7, 2018

(30) Foreign Application Priority Data

Dec. 7, 2016 (TW) .............................. 105140359 A

(51) Int. Cl.
*G02B 7/02* (2006.01)
*G02B 7/09* (2006.01)
*G02B 27/64* (2006.01)
*G02B 7/08* (2006.01)

(52) U.S. Cl.
CPC ................. *G02B 7/09* (2013.01); *G02B 7/08* (2013.01); *G02B 27/646* (2013.01)

(58) Field of Classification Search
CPC . G02B 7/00; G02B 7/003; G02B 7/02; G02B 7/023; G02B 7/04; G02B 7/09; G02B 27/64; G02B 27/646
See application file for complete search history.

(56) References Cited

U.S. PATENT DOCUMENTS

| 8,274,748 B1* | 9/2012 | Chiang | H02K 41/0356 310/12.16 |
| 2012/0154614 A1* | 6/2012 | Moriya | G03B 3/10 348/208.5 |
| 2013/0215511 A1* | 8/2013 | Wu | G02B 27/646 359/554 |

(Continued)

FOREIGN PATENT DOCUMENTS

| CN | 103529531 A | 1/2014 |
| TW | M517951 U | 2/2016 |

*Primary Examiner* — Thong Q Nguyen
(74) *Attorney, Agent, or Firm* — Muncy, Geissler, Olds & Lowe, P.C.

(57) ABSTRACT

An integrated structure of auto focus (AF) and optical image stabilizer (OIS) mechanisms includes a lens holder, a frame, magnets, suspension elements, and a driver board. The lens holder has an AF coil disposed outside thereof and is suspended in the frame. The inner edges of the sidewalls of the frame are close to but do not contact the outer edge of the AF coil. The magnets are disposed between the frame and the lens holder and correspond to the outer edge of the AF coil, for driving the lens holder back and forth along an optical axis (i.e. the Z axis). The suspension elements suspend the frame in the direction of the optical axis. The driving board has fine pattern coils each corresponding to one of the magnets, for driving the frame laterally (i.e. along the X-axis and/or Y-axis) with respect to the optical axis.

18 Claims, 9 Drawing Sheets

(56) References Cited

U.S. PATENT DOCUMENTS

2014/0177056 A1* 6/2014 Hayashi .................. G02B 7/08
 359/557
2014/0375875 A1* 12/2014 Yeo ......................... G03B 5/00
 348/373
2016/0011394 A1 1/2016 Cho et al.

* cited by examiner

INTEGRATED STRUCTURE OF AUTO FOCUS AND OPTICAL IMAGE STABILIZER MECHANISMS

CROSS REFERENCE TO RELATED APPLICATIONS

The present application claims priority of Taiwan Patent Application No. 105140359, filed on Dec. 7, 2016, the entirety of which is incorporated by reference herein.

BACKGROUND OF THE INVENTION

Field of the Invention

The invention relates to an integrated structure of auto focus (AF) and optical image stabilizer (OIS) mechanisms in a miniaturized camera module.

Description of the Related Art

Many handheld devices such as mobile phones and tablet PCs are equipped with digital camera functionality as a basic requirement nowadays, and this is possible thanks to the miniaturization of camera modules. In addition, handheld devices are usually equipped with other functions, such as auto focus (AF), anti-shaking, and so on.

Generally, an anti-shaking function can be achieved by using an electronic image stabilizer (EIS) and an optical image stabilizer (OIS). The EIS system uses complex algorithms to improve the quality of the digital image captured by the image sensor, thereby compensating for the blurred images caused by vibration of the device. But the anti-shaking effect of the EIS system is limited. The OIS system includes an image stabilizer (IS) mechanism in the camera module, which can adjust the optical focus offset between the lens and the image sensor when the device is shaken, thereby achieving a precise focus. The anti-shaking effect of the OIS system is better than that of the EIS system.

However, the IS mechanism increases the size of the camera module using the OIS system. Therefore, most devices that need to be slim (e.g. advanced mobile phones or cameras) will only use an EIS system, rather than an OIS system, to perform the anti-shaking function.

BRIEF SUMMARY OF THE INVENTION

In view of the aforementioned problems, an object of the invention is to provide an integrated structure of auto focus (AF) and optical image stabilizer (OIS) mechanisms, with which the small size of the camera (lens) module can be maintained, making it suitable for installation in advanced slim mobile phones or cameras and which allows for the use of the largest lens in the smallest space to improve the optical resolution. Also, owing to integration of the AF and OIS mechanisms, the functioning of the lens module is improved and the production cost of the lens module is reduced.

In accordance with some embodiments, an integrated structure of auto focus (AF) and optical image stabilizer (OIS) mechanisms is provided, including a lens holder, a frame, multiple magnets, multiple suspension elements, and a first driver board. The lens holder is configured to hold a lens therein. The lens and an image sensor are arranged on an optical axis. The lens holder has an AF coil disposed outside thereof and is suspended in the center of the frame via a first spring. The inner edges of the sidewalls of the frame are close to but do not contact the outer edge of the AF coil. The magnets are disposed between the frame and the lens holder and correspond to the outer edge of the AF coil. Electromagnetic induction occurs between the AF coil and the magnets when a current is supplied to the AF coil, so that the lens holder is driven back and forth along the optical axis (i.e. the Z-axis). The suspension elements are configured to suspend the frame in the direction of the optical axis. The first driver board is disposed on a side of the frame close to the image sensor and has multiple first fine pattern coils. Each of the first fine pattern coils corresponds to one of the magnets. Electromagnetic induction occurs between the first fine pattern coils and the magnets when currents are supplied to the first fine pattern coils, so that the frame is driven laterally (i.e. along the X-axis and/or Y-axis) with respect to the optical axis In accordance with some embodiments, the frame comprises a metal material. Every two adjacent sidewalls of the frame and the outer edge of the AF coil form a corner space therebetween. The magnets are respectively disposed in the corner spaces.

In accordance with some embodiments, each of the corner spaces further has an L-shaped plate disposed therein. The L-shaped plate includes a first plate and a second plate. The first plate has a triangular shape, and two sides of the first plate are respectively connected to one side of the two adjacent sidewalls of the frame. The second plate has a long plate shape, and the second plate extends from the third side of the first plate toward the other side of the sidewalls and faces the corner between the two adjacent sidewalls. One of the magnets is close to the first plate and the two adjacent sidewalls, and a gap is formed between the magnet and the second plate, so that the AF coil can be inserted into the gap.

In accordance with some embodiments, the magnets have a trapezoid or triangular shape which matches the shape of the corner spaces. Also, one face of the magnets facing the outer edge of the AF coil is flat or curved which matches the shape of the AF coil.

In accordance with some embodiments, one face of the second plate of the L-shaped plate corresponding to the inner edge of the AF coil is flat or curved which matches the shape of the AF coil.

In accordance with some embodiments, each of the magnets includes two strip magnets arranged in an L-shaped pattern and close to the two adjacent sidewalls of the frame.

In accordance with some embodiments, each of the first fine pattern coils includes two coils (X-axis coil and Y-axis coil) arranged in an L-shaped pattern and corresponding to the two strip magnets (X-axis magnet and Y-axis magnet).

In accordance with some embodiments, the integrated structure of AF and OIS mechanisms further comprises a second driver board disposed on a side of the frame away from the image sensor. The frame is between the first and second driver boards. The second driver board has multiple second fine pattern coils each corresponding to one of the magnets, so that the magnets are between the first and second fine pattern coils.

In accordance with some embodiments, each of the first fine pattern coils and the corresponding second fine pattern coils are electrically connected to generate corresponding electromagnetic driving forces.

In accordance with some embodiments, each of the second fine pattern coils includes two coils (X-axis coil and Y-axis coil) arranged in an L-shaped pattern.

In accordance with some embodiments, the first spring is a thin spring sheet disposed on a side of the frame and the lens holder close to the image sensor. The first spring is indirectly connected to the frame by connecting to the magnets.

In accordance with some embodiments, the integrated structure of AF and OIS mechanisms further comprises a second spring. The second spring is a thin spring sheet disposed on a side of the frame and the lens holder away from the image sensor and connected between the frame and the lens holder.

In accordance with some embodiments, the integrated structure of AF and OIS mechanisms further comprises a partition board disposed between the second spring and the frame. The center of the partition board has an opening to allow the lens holder to pass through. The inner edge of the opening has a concave-convex shape corresponding to a concave-convex surface on the outside of the lens holder, so as to restrict the lens holder to only move back and forth along the optical axis.

In accordance with some embodiments, the suspension elements are connected between the second spring and the first driver board.

In accordance with some embodiments, the suspension elements are suspension wires located outside of the corner spaces of the frame.

In accordance with some embodiments, the suspension elements are snake-shaped springs located on four outer edges of the second spring.

In accordance with some embodiments, the snake-shaped springs extend from and are integrally formed with the second spring.

In accordance with some embodiments, the integrated structure of AF and OIS mechanisms further comprises a base and a casing. The base has a base opening which is centered on the optical axis. The casing is coupled to the base and has a casing opening which is centered on the optical axis. The base opening and the casing opening correspond to each other and form a through hole.

In accordance with some embodiments, the first driver board is disposed on the base. The suspension elements are indirectly connected to the first driver board by connecting to the base.

In accordance with some embodiments, the integrated structure of AF and OIS mechanisms further comprises at least one vibration detection element and at least one displacement sensing assembly. The vibration detection element is used to detect vibration and generate a vibration signal to transmit to the first driver board, so that the first fine pattern coils generate an electromagnetic driving force along the X-axis or Y-axis based on the vibration signal. The displacement sensing assembly includes a displacement sensor and a sensing magnet, which is used to detect the amount of displacement between the frame and the first driver board in the direction of the X-axis or Y-axis.

In order to illustrate the purposes, features, and advantages of the invention, the preferred embodiments and drawings of the invention are shown in detail as follows.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
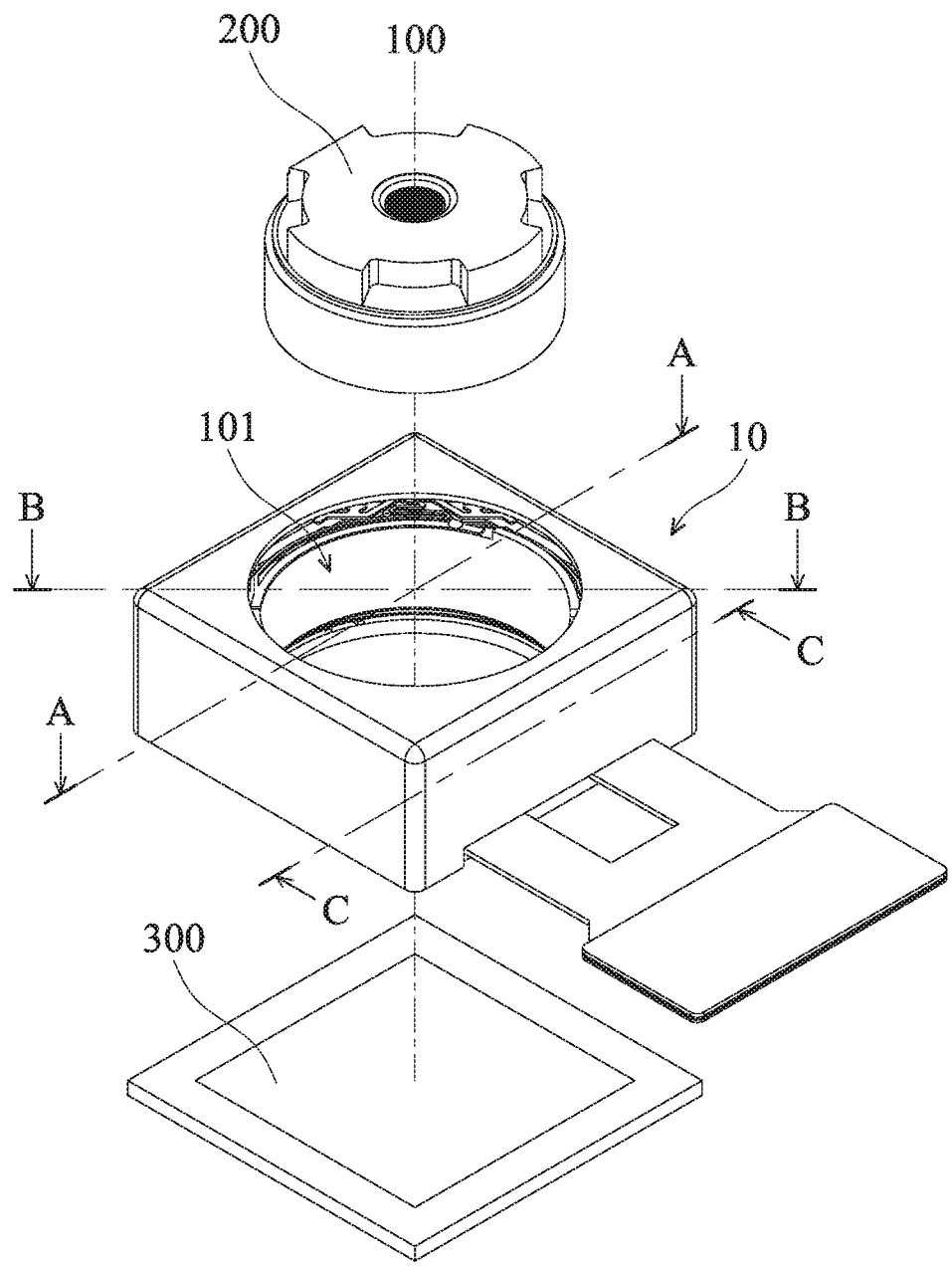
FIG. 1 is a schematic view showing that a lens module, a lens, and an image sensor are positioned on an optical axis in accordance with an embodiment.

The following description is of the best-contemplated mode of carrying out the invention. This description is made for the purpose of illustrating the general principles of the invention and should not be taken in a limiting sense. The scope of the invention is best determined by reference to the appended claims.

In the following detailed description, the orientations of "on", "above", "under", and "below" are used for representing the relationship between the relative positions of each element as illustrated in the drawings, and are not meant to limit the invention. Moreover, the formation of a first element on or above a second element in the description that follows may include embodiments in which the first and second elements are formed in direct contact, or the first and second elements have one or more additional elements formed therebetween.

In addition, the present disclosure may repeat reference numerals and/or letters in the various examples. This repetition is for the purpose of simplicity and clarity and does not in itself dictate a relationship between the various embodiments and/or configurations discussed. Various features may be arbitrarily drawn in different scales for the sake of simplicity and clarity. Furthermore, some elements not shown or described in the embodiments have the forms known by persons skilled in the field of the invention.

A camera (lens) module is provided in accordance with various exemplary embodiments. With an integrated structure of auto focus (AF) and optical image stabilizer (OIS) mechanisms, the lens module allows for the use of the largest lens in the smallest space to improve the optical resolution. Also, owing to integration of the AF and OIS mechanisms, the functioning of the lens module is improved and the production cost of the lens module is reduced.

Figure 2:
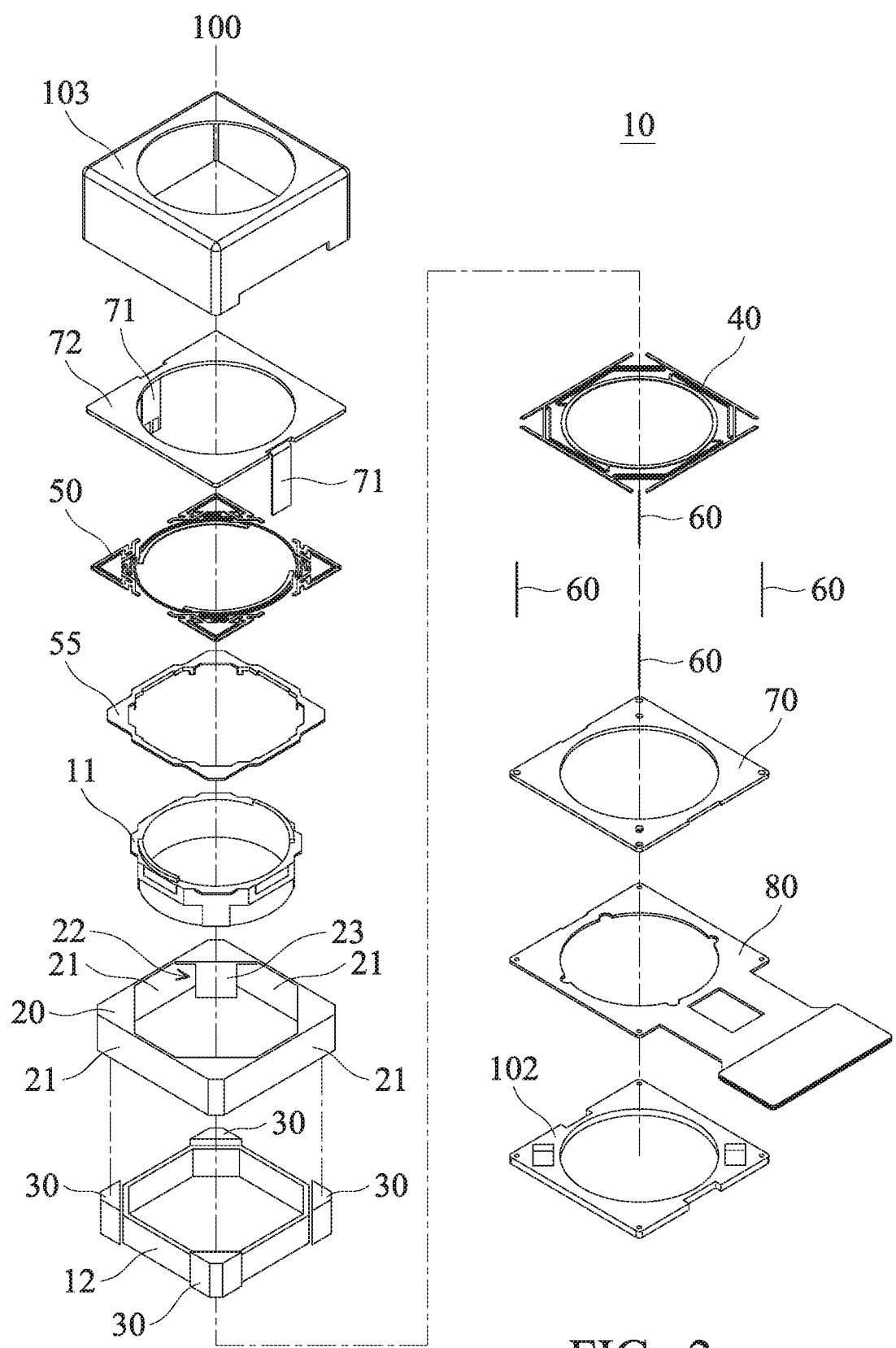
FIG. 2 is an exploded view of the lens module in FIG. 1.
Figure 3:
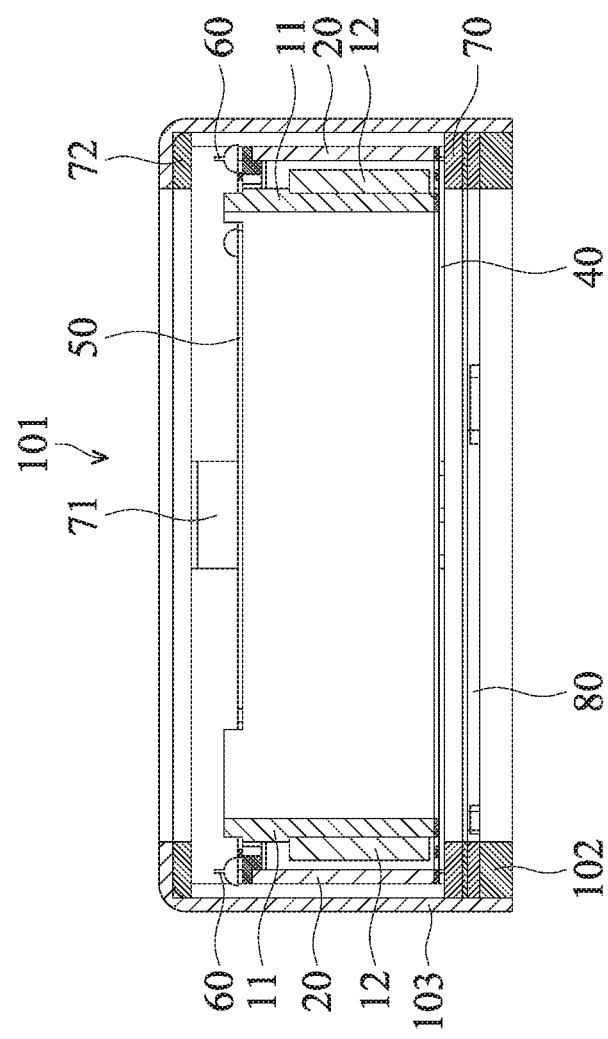
FIG. 3 is a cross-sectional view taken along the line A-A in FIG. 1.
Figure 4:
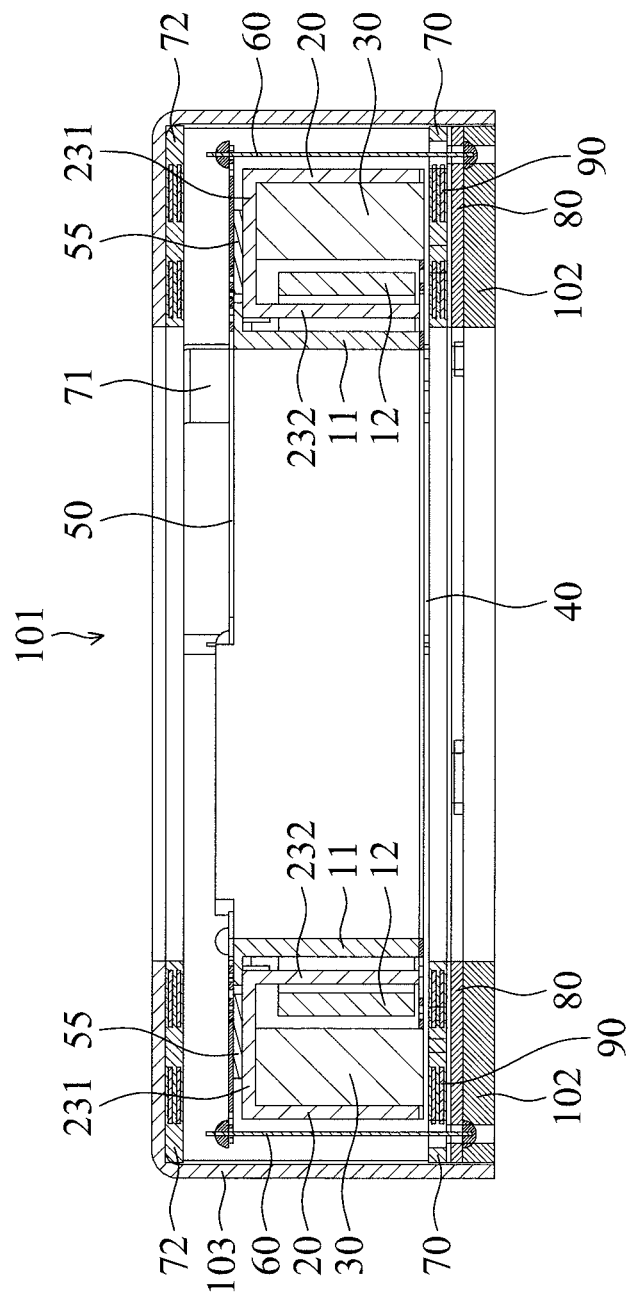
FIG. 4 is a cross-sectional view taken along the line B-B in FIG. 1.
Figure 5:
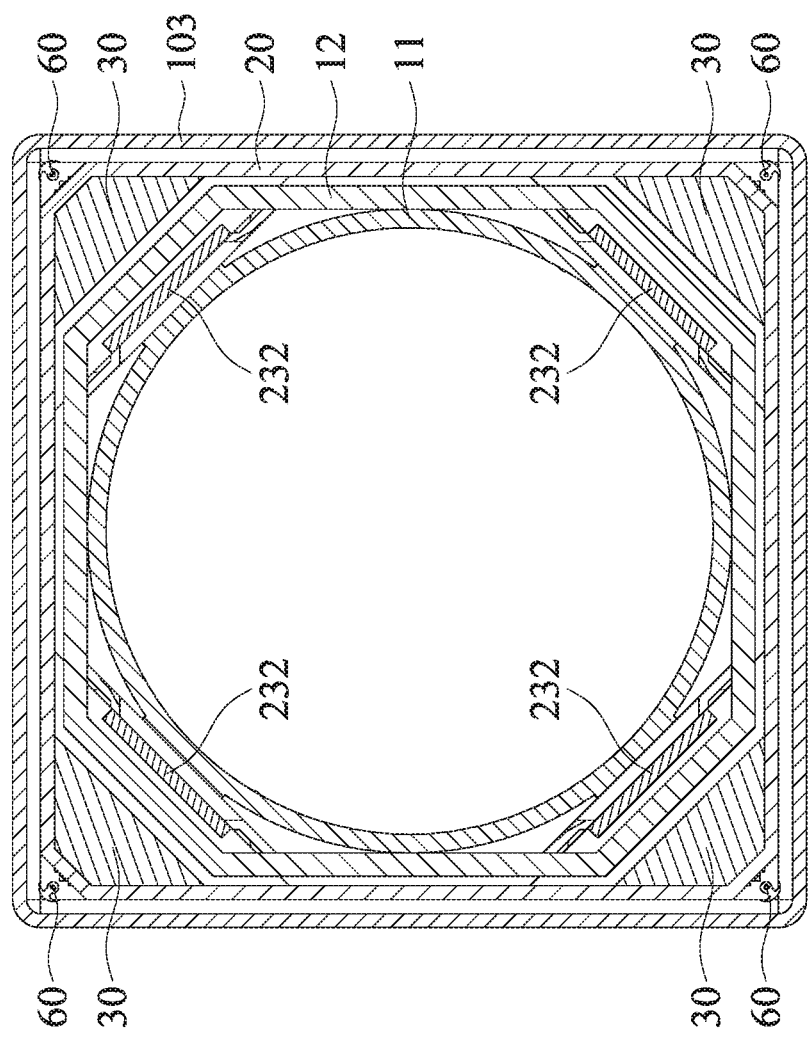
FIG. 5 is a cross-sectional view taken along the line C-C in FIG. 1.

FIG. 1 is a schematic view showing that a lens module, a lens, and an image sensor are positioned on an optical axis in accordance with an embodiment. FIG. 2 is an exploded view of the lens module in FIG. 1. FIG. 3 is a cross-sectional view taken along the line A-A in FIG. 1. FIG. 4 is a cross-sectional view taken along the line B-B in FIG. 1. FIG. 5 is a cross-sectional view taken along the line C-C in FIG. 1.

Referring to FIG. 1, a lens module 10 in accordance with an embodiment has a cubic appearance and has a through hole 101 thereon. A (camera) lens 200 can be installed into the lens module 10 via one end of the through hole 101, and the other end of the through hole 101 faces an image sensor 300 below it. The center of the through hole 101 is located on an optical axis 100, so that the lens 200 and the image sensor 300 can perform image focusing in the direction of optical axis 100. In this embodiment, the lens 200 has a cylindrical structure, and the shape of the through hole 101 is circular to correspond to the shape of the lens 200. In some embodiments, the shape of the lens 200 and the through hole 101 may also be elliptical, rectangular, or other irregular shapes, Referring to FIG. 2, the cubic lens module 10 is formed by a base 102 and a U-shaped casing 103. The center of the base 102 has a base opening which is centered on the optical axis 100. The opening of the U-shaped casing 103 is coupled to the base 102, and the casing 103 also has a casing opening which is centered on the optical axis 100. The base opening of the base 102 and the casing opening of the casing 103 correspond to each other and form the through hole 101.

In this embodiment, the lens module 10 further includes an auto focus (AF) mechanism and an optical image stabilizer (OIS) mechanism in addition to the casing 103 and the base 102. The AF mechanism includes a lens holder 11, an AF coil 12, a frame 20, four magnets 30, a first spring 40, and a second spring 50. The OIS mechanism includes four magnets 30, a second spring 50, four suspension elements 60, and a first driver board 70. The four magnets 30 and the second spring 50 are shared components of the AF and OIS mechanisms.

The detailed structure of the lens module 10 is illustrated with references to FIGS. 2 to 5. The lens holder 11 has a hollow cylindrical structure, and its center is located on the optical axis 100 and corresponds to the casing opening described above. The lens holder 11 is configured to hold the lens 200 (see FIG. 1) therein. The AF coil 12 is disposed outside of the lens holder 11. In some embodiments, the AF coil 12 is wound around the outside of the lens holder and forms a ring (for example, circular ring or octagonal ring) shape.

As shown in FIGS. 2 to 5, the frame 20 is a square frame having two openings (their centers are also located on the optical axis 100) on opposite sides and four sidewalls 21. In this embodiment, the frame 20 is made of a metal material, but the invention is not limited thereto. The lens holder 11 is suspended in the center of the frame 20 via the first spring 40 and the second spring 50. The inner edges of the sidewalls 21 of the frame 20 are close to but do not contact the outer edge of the AF coil 12. Moreover, every two adjacent sidewalls 21 of the frame 20 and the outer edge of the AF coil form a corner space 22 therebetween (i.e. there are four corner spaces 22 correspond to the four corners of the frame 20). Each of the corner spaces 22 has a magnet 30 therein (disposed between the frame 20 and the lens holder 11). In accordance with some embodiments, the magnets 30 have a trapezoid or triangular shape which matches the shape of the corner spaces 22, so that the magnets 30 are disposed outside of the AF coil 12 and do not contact the AF coil 12. When a current is supplied to the AF coil 12, electromagnetic induction occurs between the AF coil 12 and the magnets 30 (i.e. an electromagnetic driving force is generated therebetween), so that the lens holder 11 is driven back and forth along the optical axis 100 (i.e. along the Z-axis), and the lens 200 and the image sensor 300 can perform image focusing.

Furthermore, each of the corner spaces 22 has an L-shaped plate 23 therein, including a first plate 231 and a second plate 232. The first plate 231 has a triangular shape, and two sides of the first plate 231 are respectively connected to one side (such as the side away from the image sensor 300) of the two adjacent sidewalls 21 of the frame 20. The second plate 232 has a long plate shape, and the second plate 232 extends from the third side of the first plate 231 toward the other side (such as the side close to the image sensor 300) of the sidewalls 21 and faces the corner between the two adjacent sidewalls 21. In this embodiment, the width of the second plate 232 is less than the width of the third side of the first plate 231, and the length of the second plate 232 is less than or equal to the height of the sidewalls 21.

It should be noted that, in this embodiment, the magnet 30 disposed in the corner space 22 is close to the first plate 231 and the two adjacent sidewalls 21, and a gap is formed between the magnet 30 and the second plate 232, so that the AF coil 12 can be inserted into the gap. As shown in FIG. 4. The AF coil 12 is positioned between the second plate 232 and the magnet 30 and does not contact the magnet 30 and the second plate 232. Since the L-shaped plates 23 extend from the sidewalls 21 of the frame 20, the magnetic lines of the magnets 30 can extend to the inner edge of the AF coil 12 through the L-shaped plates 23. Accordingly, both the outer edge and inner edge of the AF coil 12 work with the magnets 30 to generate and enhance the electromagnetic driving force.

Figure 6:
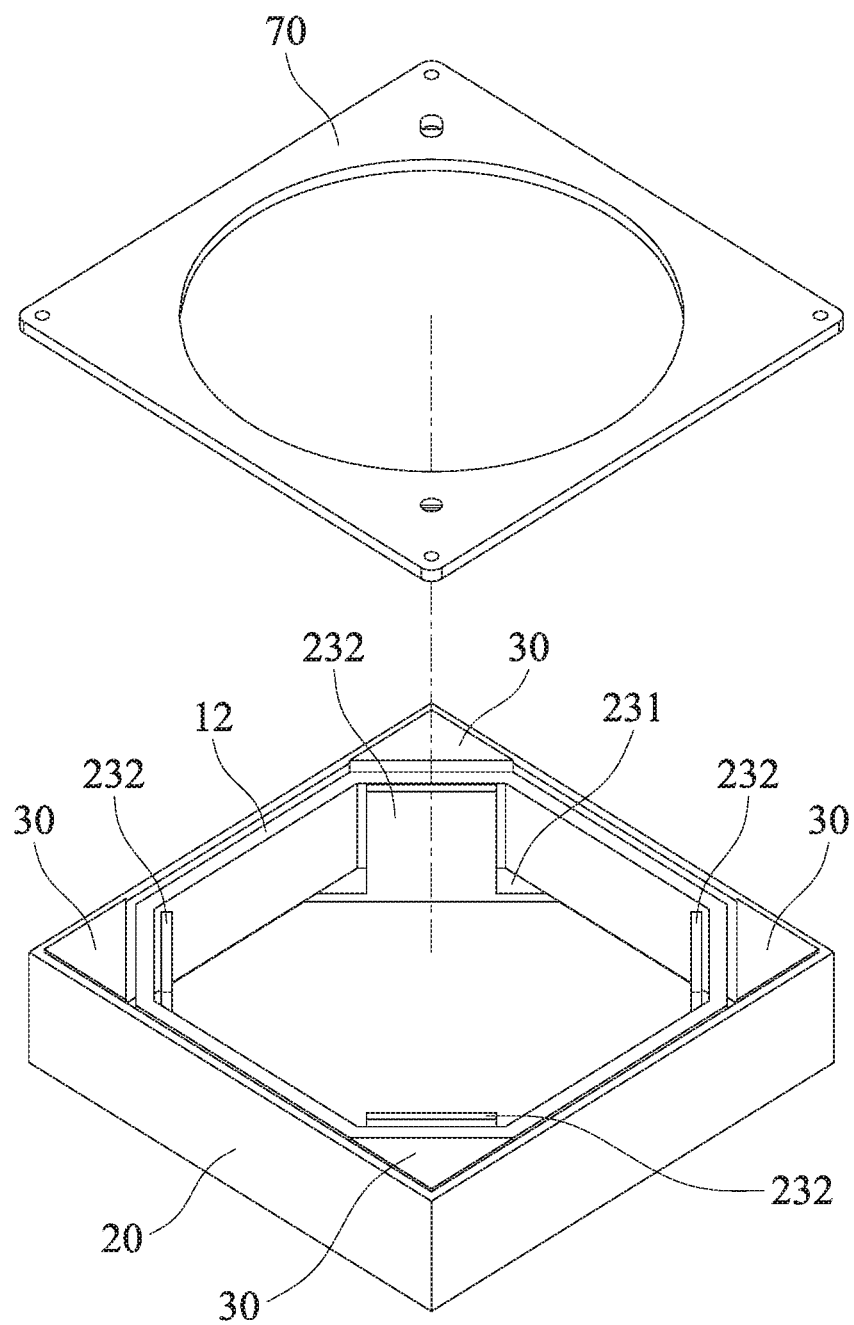
FIG. 6 is a schematic view of partial elements in accordance with an embodiment.

FIG. 6 is a schematic view of partial elements in accordance with an embodiment. As shown in FIG. 6, the AF coil 12 has an octagonal ring shape. Each of the magnets 30 has a triangular shape, and the face of the magnet 30 facing the outer edge of the AF coil 12 is flat which matches the shape of the AF coil 12. In addition, the face of the second plate 232 of the L-shaped plates 23 (see FIG. 2) corresponding to the inner edge of the AF coil 12 is also flat which matches the shape of the AF coil 12.

Figure 7:
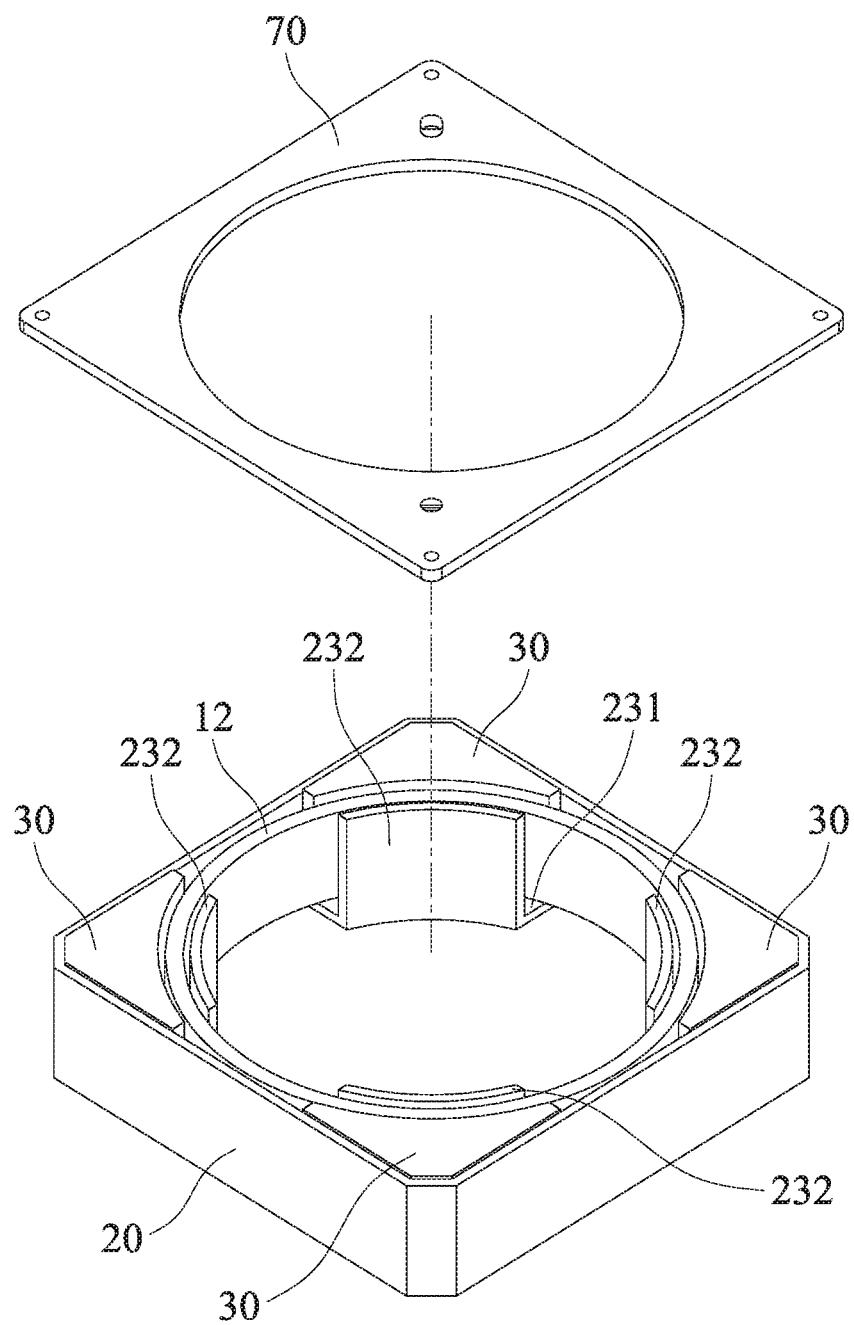
FIG. 7 is a schematic view of partial elements in accordance with another embodiment.

FIG. 7 is a schematic view of partial elements in accordance with another embodiment. As shown in FIG. 7, the AF coil 12 has a circular ring shape. Each of the magnets 30 has a trapezoid shape, and the face of the magnet 30 facing the outer edge of the AF coil 12 is curved which matches the shape of the AF coil 12. In addition, the face of the second plate 232 of the L-shaped plates 23 (see FIG. 2) corresponding to the inner edge of the AF coil 12 is also curved which matches the shape of the AF coil 12.

Figure 8:
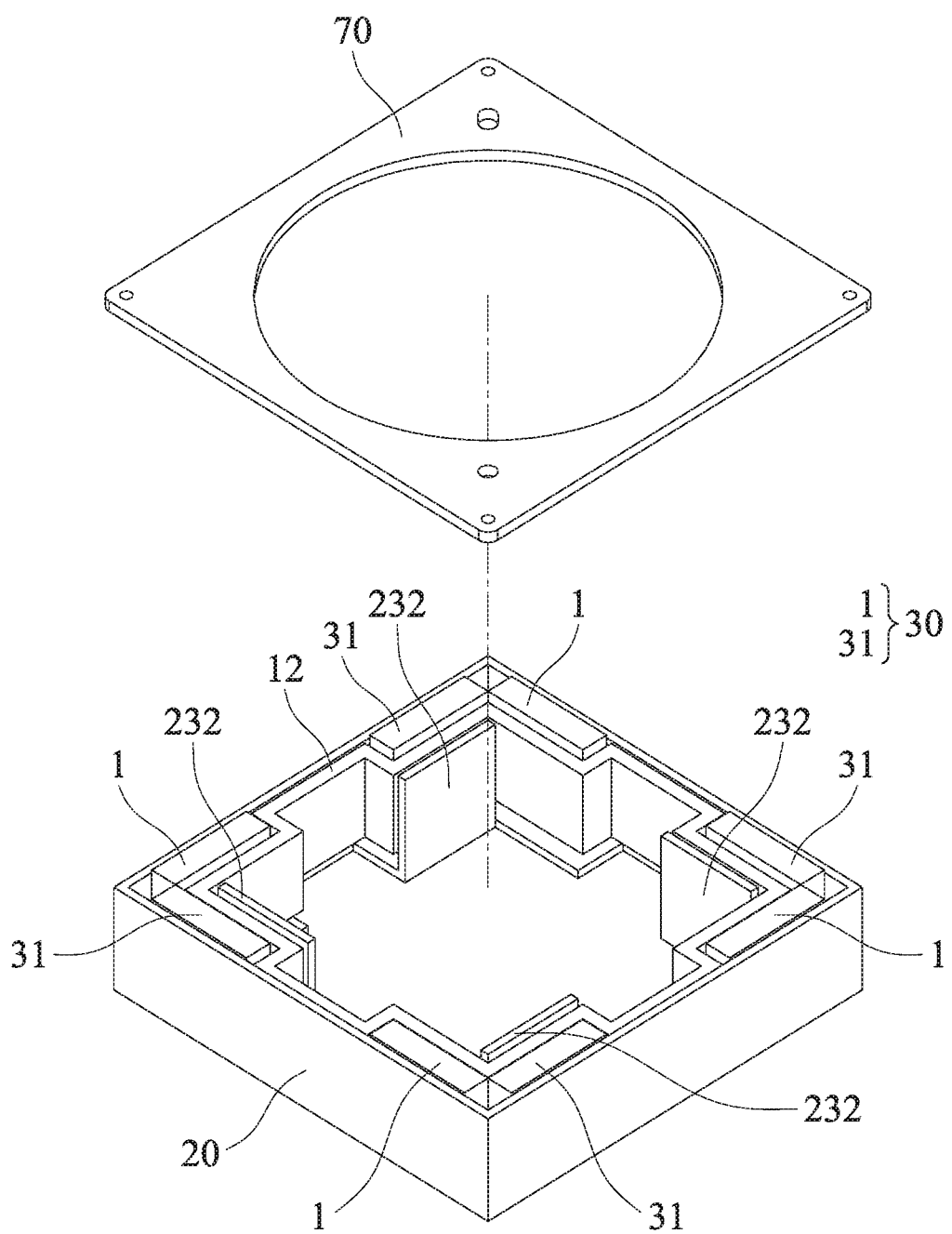
FIG. 8 is a schematic view of partial elements in accordance with yet another embodiment.

FIG. 8 is a schematic view of partial elements in accordance with yet another embodiment. As shown in FIG. 8, each of the magnets 30 include two strip magnets 31 arranged in an L-shaped pattern and close to the two adjacent sidewalls 21 of the frame 20. The second plate 232 of the L-shaped plate 23 of the frame 20 is a flat and close to one of the two strip magnets 31. The AF coil 12 is formed with a concave-convex shape to conform to the shape of the magnets 31. In some embodiments, the second plate 232 may also be an L-shaped plate and close to the two strip magnets 31.

Referring to FIGS. 2 to 5, both the first spring 40 and the second spring 50 are connected between the frame 20 and the lens holder 11. Accordingly, the lens holder 11 is elastically suspended in the center of the frame 20 and may carry the lens 200 to move back and forth along the optical axis 100. Specifically, the first spring 40 is a thin spring sheet that is disposed on one side of the frame 20 and the lens holder 11 close to the image sensor 300. In this embodiment, the first spring 40 is indirectly connected to the frame 20 by connecting to the magnets 30. The second spring 50 is also a thin spring sheet that is disposed on one side of the frame 20 and the lens holder 11 away from the image sensor 300.

In this embodiment, a partition board 55 is also disposed between the second spring 50 and the frame 20, and the center of the partition board 55 has an opening to allow the lens holder 11 to pass through. As shown in FIG. 2, the inner edge of the opening of the partition board 55 has a concave-convex shape corresponding to a concave-convex surface on the outside of the lens holder 11, so as to restrict the lens holder 11 to only move back and forth along the optical axis 100 and prevent the lens holder 11 from rotating about the optical axis 100. As shown in FIG. 4, the partition board 55 is connected to the top of the frame 20 and the outer peripheral portion of the second spring 50, and the partition board 55 may comprise a non-conductive material (such as plastic), so that the frame 20 and the second spring 50 are electrically insulated by the partition board 55. In this embodiment, the second spring 50 is also electrically connected to the AF coil 12.

Referring to FIGS. 2 to 5, the suspension elements 60 suspend the frame 20 and the AF mechanism and the lens 200 therein in the direction of the optical axis 100 inside the casing 103, so that the lens 200 can face the image sensor 300 (see FIG. 1) outside the base 102. In addition, the first driver board 70 is disposed on the base 102 and has four first fine pattern coils (FPcoils) 90. Each of the first fine pattern coils 90 corresponds to one of the magnets 30. Accordingly, when currents are supplied to the first fine pattern coils 90, electromagnetic induction occurs between the first fine pattern coils 90 and the magnets 30 (i.e. electromagnetic driving forces are generated therebetween), so that the frame 20 is driven laterally (i.e. along the X-axis and/or Y-axis) with respect to the optical axis 100. Consequently, the out-of-focus image caused by the vibration between the lens 200 and the image sensor 300 can be adjusted or corrected.

In this embodiment, the suspension elements 60 are suspension wires which are located outside of the four corner spaces 22 of the frame 20 and connected between the second spring 50 and the first driver board 70. More specifically, the suspension elements 60 are indirectly connected to the first driver board 70 by connecting to the base 102. In addition, a circuit board 80 is stacked between the base 102 and the first driver board 70, and the circuit board 80 includes an AF driver circuit and an OIS driver circuit thereon.

Figure 9:
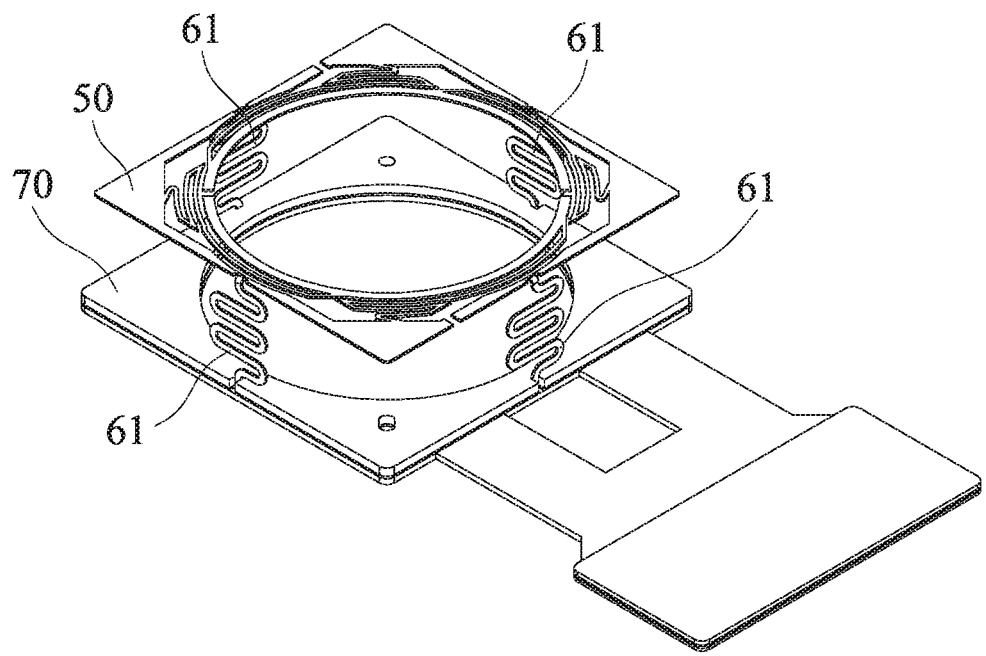
FIG. 9 is a schematic view showing that the suspension elements are snake-shaped springs in accordance with an embodiment.

FIG. 9 is a schematic view showing that the suspension elements are snake-shaped springs in accordance with an embodiment. As shown in FIG. 9, the suspension elements may also be snake-shaped springs 61. The snake-shaped springs 61 extend from the center of the four outer edges of the second spring 50 and are integrally formed with the second spring 50. Also, the snake-shaped springs 61 are bent toward the direction of the first driver board 70 and connected to the first driver board 70.

Figure 10:
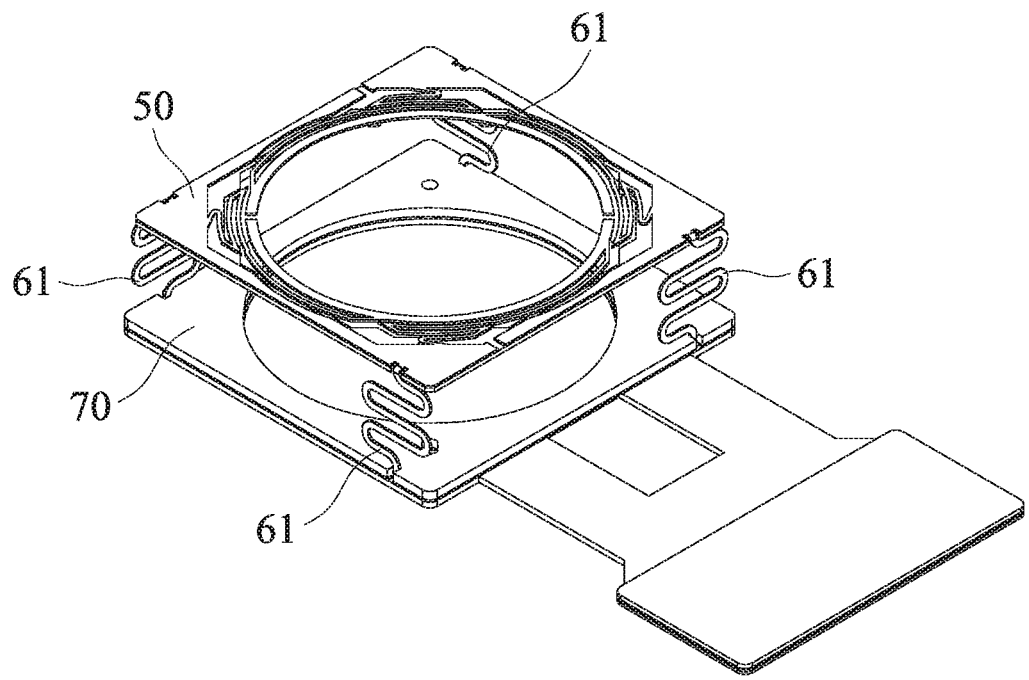
FIG. 10 is a schematic view showing that the suspension elements are snake-shaped springs in accordance with another embodiment.

FIG. 10 is a schematic view showing that the suspension elements are snake-shaped springs in accordance with another embodiment. As shown in FIG. 10, the snake-shaped springs 61 can also extend from the end portion of the four outer edges of the second spring 50 and be integrally formed with the second spring 50. Also, the snake-shaped springs 61 are bent toward the direction of the first driver board 70 and connected to the first driver board 70.

In the lens module of embodiments described above, as the magnets 30 are shared components of the AF mechanism and the OIS mechanism and the size of the magnets 30 is limited by the four corner spaces 22 of the frame 20, the largest lens can be used in the smallest space to improve the optical resolution.

In order to enhance the electromagnetic driving forces between the OIS mechanism and the magnets 30, a second driver board 72 (see FIGS. 2 to 4) is further disposed on a side of the frame 20 away from the image sensor 300, so that the frame 20 is between the first driver board 70 and the second driver board 72. Similar to the first driver board 70, the second driver board 72 also has four second fine pattern coils 90, and each of the second fine pattern coils corresponds to one of the magnets 30. The magnets 30 are located between the first fine pattern coils 90 and the second fine pattern coils. In this embodiment, two electrical connection cables 71 are further disposed between the first driver board 70 and the second driver board 72 to electrically connect each of the first fine pattern coils 90 to the corresponding second fine pattern coils, so as to generate corresponding and consistent electromagnetic driving forces on both sides of the magnets 30.

In some embodiments, each of the first fine pattern coils includes two coils (X-axis coil and Y-axis coil) arranged in an L-shaped pattern (not shown), and each of the magnets 30 also includes two strip magnets (X-axis magnet and Y-axis magnet) corresponding to the X-axis and Y-axis coils. In addition, each of the second fine pattern coils also includes two coils (X-axis coil and Y-axis coil) arranged in an L-shaped pattern (not shown) and corresponding to the X-axis and Y-axis magnets of the magnet 30.

In the above embodiments, the OIS mechanism may also include at least one vibration detection element (not shown) and at least one displacement sensing assembly (not shown) mounted on the circuit board 80, for example. The vibration detection element may be a Gyro Sensor, an accelerometer, or the like, which is generally installed on an advanced mobile phone or tablet PC. The vibration detection element is used to detect vibration and generate a vibration signal to transmit to the first driver board, so that the first fine pattern coils generate an electromagnetic driving force along the X-axis or Y-axis based on the vibration signal. The displacement sensing assembly includes a displacement sensor and a sensing magnet. The displacement sensor may be a dual-axis (X-axis and Y-axis) sensing IC, a Hall sensor, a MR sensor, a fluxgate, an optical position sensor, an optical encode, or the like, which corresponds to the sensing magnet (s) in the X-axis and/or the Y-axis (for example, the magnets 30 in the X-axis and Y-axis are shared and used as the sensing magnets of the displacement sensing assembly). The displacement sensing assembly is used to detect the amount of displacement between the frame 20 and the first driver board 70 in the direction of the X-axis or Y-axis and feedback to the first driver board 70 to precisely control the displacement of the frame 20.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An integrated structure of auto focus (AF) and optical image stabilizer (OIS) mechanisms, comprising:
   a lens holder configured to hold a lens therein, the lens and an image sensor being arranged on an optical axis, and an AF coil is disposed outside of the lens holder;
   a frame, wherein the lens holder is suspended in a center of the frame via a first spring, and inner edges of sidewalls of the frame are close to but do not contact an outer edge of the AF coil;

a plurality of magnets disposed between the frame and the lens holder and corresponding to the outer edge of the AF coil, and electromagnetic induction occurs between the AF coil and the magnets, so that the lens holder is driven back and forth along a direction that is parallel to the optical axis;

a plurality of suspension elements configured to suspend the frame in the direction that is parallel to the optical axis; and a first driver board disposed on a side of the frame close to the image sensor and having a plurality of first fine pattern coils, wherein each of the first fine pattern coils corresponds to one of the magnets, and electromagnetic induction occurs between the first fine pattern coils and the magnets, so that the frame is driven laterally with respect to the optical axis, wherein the frame comprises a metal material, and every two adjacent sidewalls of the frame and the outer edge of the AF coil form a corner space therebetween, and the magnets are respectively disposed in the corner spaces, and wherein each of the corner spaces further has an L-shaped plate disposed therein, the L-shaped plate including:
a first plate having a triangular shape, wherein two sides of the first plate are respectively connected to a side of the frame which is away from the image sensor; and
a second plate having a long late shape, wherein the second plate extends from a third side of the first plate toward a side of the frame which is close to the image sensor, wherein each of the magnets is close to the first plate and the two adjacent sidewalls, and a gap is formed between each of the magnets and the second plate, so that the AF coil is inserted into the gap.

2. The integrated structure of auto focus and optical image stabilizer mechanisms as claimed in claim 1, wherein each of the magnets has a trapezoid or triangular shape which matches a shape of each of the corner spaces, and one face of each of the magnets facing the outer edge of the AF coil is flat or curved which matches a shape of the AF coil.

3. The integrated structure of auto focus and optical image stabilizer mechanisms as claimed in claim 1, wherein one face of the second plate of the L-shaped plate corresponding to an inner edge of the AF coil is flat or curved which matches a shape of the AF coil.

4. The integrated structure of auto focus and optical image stabilizer mechanisms as claimed in claim 1, wherein each of the magnets includes two strip magnets arranged in an L-shaped pattern and close to the two adjacent sidewalls of the frame.

5. The integrated structure of auto focus and optical image stabilizer mechanisms as claimed in claim 4, wherein each of the first fine pattern coils includes two coils arranged in an L-shaped pattern and corresponding to the two strip magnets.

6. The integrated structure of auto focus and optical image stabilizer mechanisms as claimed in claim 1, further comprising:
a second driver board disposed on a side of the frame away from the image sensor, and the frame being between the first and second driver boards, wherein the second driver board has a plurality of second fine pattern coils each corresponding to one of the magnets, so that the magnets are between the first and second fine pattern coils.

7. The integrated structure of auto focus and optical image stabilizer mechanisms as claimed in claim 6, wherein each of the first fine pattern coils and the corresponding second fine pattern coils are electrically connected to generate corresponding electromagnetic driving forces.

8. The integrated structure of auto focus and optical image stabilizer mechanisms as claimed in claim 6, wherein each of the second fine pattern coils includes two coils (X-axis coil and Y-axis coil) arranged in an L-shaped pattern.

9. The integrated structure of auto focus and optical image stabilizer mechanisms as claimed in claim 1, wherein the first spring is a thin spring sheet disposed on a side of the frame and the lens holder close to the image sensor, and the first spring is indirectly connected to the frame by connecting to the magnets.

10. The integrated structure of auto focus and optical image stabilizer mechanisms as claimed in claim 9, further comprising:
a second spring which is a thin spring sheet disposed on a side of the frame and the lens holder away from the image sensor and connected between the frame and the lens holder.

11. The integrated structure of auto focus and optical image stabilizer mechanisms as claimed in claim 10, further comprising:
a partition board disposed between the second spring and the frame, wherein a center of the partition board has an opening to allow the lens holder to pass through, and an inner edge of the opening has a concave-convex shape corresponding to a concave-convex surface on an outside of the lens holder, so as to restrict the lens holder to only move back and forth along the optical axis.

12. The integrated structure of auto focus and optical image stabilizer mechanisms as claimed in claim 10, wherein the suspension elements are connected between the second spring and the first driver board.

13. The integrated structure of auto focus and optical image stabilizer mechanisms as claimed in claim 12, wherein the suspension elements are suspension wires located outside of the corner spaces of the frame.

14. The integrated structure of auto focus and optical image stabilizer mechanisms as claimed in claim 12, wherein the suspension elements are snake-shaped springs located on four outer edges of the second spring.

15. The integrated structure of auto focus and optical image stabilizer mechanisms as claimed in claim 14, wherein the snake-shaped springs extend from and are integrally formed with the second spring.

16. The integrated structure of auto focus and optical image stabilizer mechanisms as claimed in claim 1, further comprising:
a base having a base opening which is centered on the optical axis; and
a casing coupled to the base and having a casing opening which is centered on the optical axis, wherein the base opening and the casing opening correspond to each other and form a through hole.

17. The integrated structure of auto focus and optical image stabilizer mechanisms as claimed in claim 16, wherein the first driver board is disposed on the base, and the suspension elements are indirectly connected to the first driver board by connecting to the base.

18. The integrated structure of auto focus and optical image stabilizer mechanisms as claimed in claim 17, further comprising a circuit board stacked between the base and the first driver board, wherein the circuit board is provided with:

at least one vibration detection element used to detect vibration and generate a vibration signal to transmit to the first driver board, so that the first fine pattern coils generate an electromagnetic driving force along the X-axis or Y-axis based on the vibration signal; and at least one displacement sensing assembly including a displacement sensor and a sensing magnet, which is used to detect an amount of laterally displacement between the frame and the first driver board with respect to the optical axis.

* * * * *